Oct. 24, 1967  W. L. DUDLEY  3,349,311
CONTROL CIRCUIT FOR UNSYMMETRICAL POWER CONVERTER
Filed Oct. 14, 1965
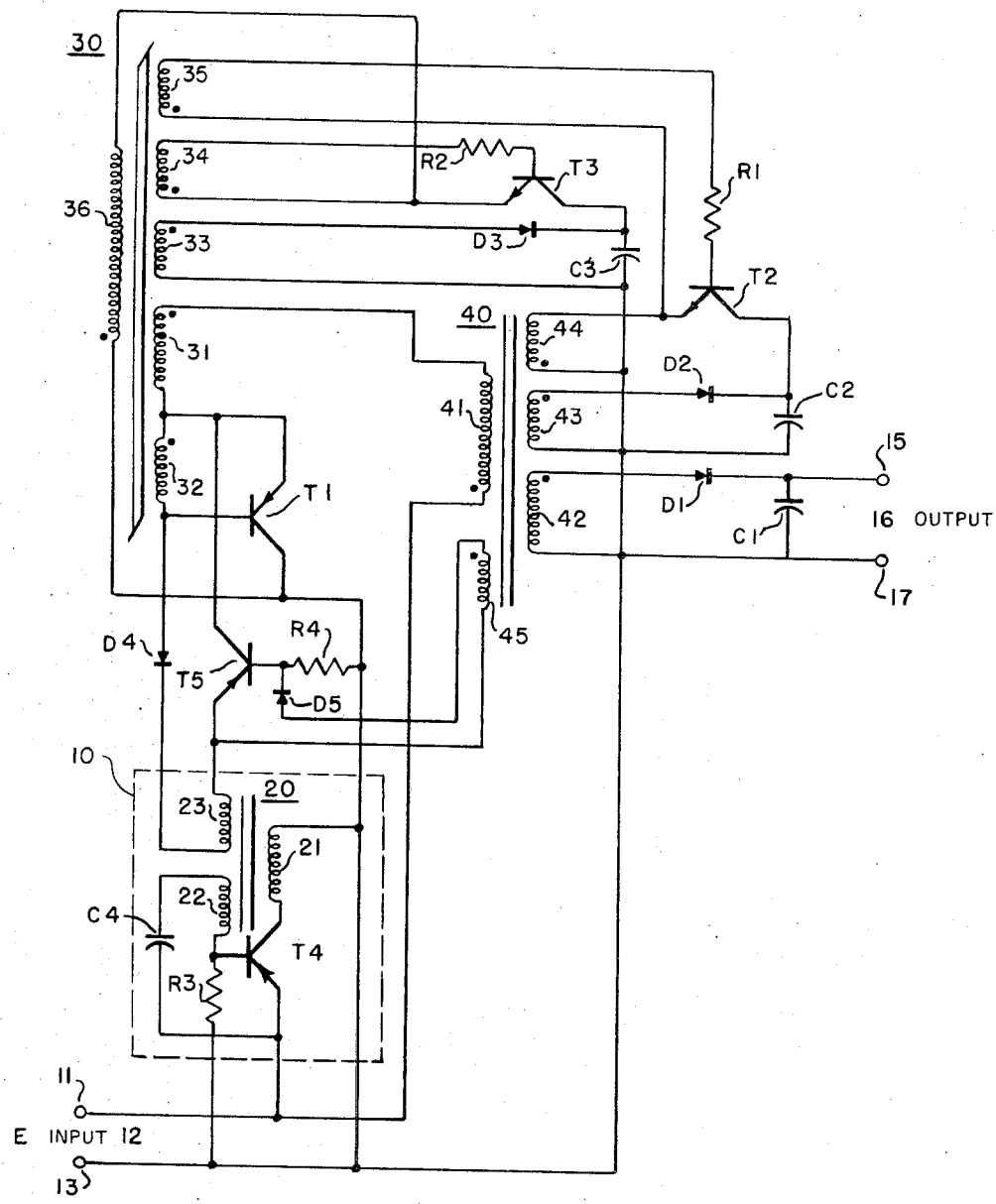
INVENTOR.
WILLIAM L. DUDLEY.

3,349,311
CONTROL CIRCUIT FOR UNSYMMETRICAL POWER CONVERTER

William L. Dudley, Shrewsbury, N.J., assignor to the United States of America as represented by the Secretary of the Army
Filed Oct. 14, 1965, Ser. No. 496,203
4 Claims. (Cl. 321—2)

The invention described herein may be manufactured and used by or for the Government for governmental purposes without the payment of any royalty thereon.

This invention relates to converters and particularly to direct-current converters.

More particularly this invention relates to low-voltage, D-C to D-C, power converters having an unsymmetrical waveform.

There are many systems for converting a low voltage source to a high voltage and one of the more common systems utilizes a switching circuit for chopping or turning on and off the source of low-voltage D-C to produce a form of an A-C, at the same voltage level, which can then be stepped up by transformer action to any desired voltage to be rectified to produce direct current at the higher level.

Most of these converting systems are two-leg, push-pull devices with two switches actuated alternately. These produce a counter voltage in the transformer that is twice the value of the source voltage. Also, these are voltage-operated devices where the operating voltages are taken from the same transformer that transfers the power from the source to the output load. In this case, as the load increases the operating voltages decrease; consequently, at the very time when greater control power is needed, less is available. Furthermore, these often have saturable reaction to produce voltage changes for switching functions, which require considerable energy in a transformer that must also carry the output load.

It is therefore an object of this invention to provide an improved power converter that is simpler, more efficient, and more reliable.

It is a further object of this invention to provide an improved, unsymmetrical, power converter where the transistor is always maintained in a state of saturation during its conduction period.

It is a further object of this invention to provide a power converter that will operate under optimum conditions over a wide variation of load.

It is a further object of this invention to provide an improved converter, actuated by a saturating transformer that is not influenced by load-current variations.

These and other objects of this invention are accomplished by connecting a power-switching transistor in series with windings of both a current transformer and a power transformer across a source of low voltage. Windings are provided for storing energy during the transistor-conducting portion of the cycle and until the current transformer is driven to a state of saturation. At this time the switching is reversed; the transistor is cut off; and the energy that was stored during the conducting portion of the cycle is switched back thru the appropriate transformers to rest the power transformers and to reverse the polarity of the saturation of the current transformer core; which again reverse the transformer voltage polarities to re-start the conducting portion of the cycle.

This invention will be better understood and further objects of this invention will become apparent from the following specification and the drawing which shows a circuit diagram of this invention:

Referring now to the drawing, a current transformer 30 and a power transformer 40 are shown along with a primary power transistor $T_1$. The input 12 has terminals 11 and 13 for connection to a low-voltage source of direct current. The output 16 has terminals 15 and 17 to be connected to any desired utilization circuit. A starting circuit 10 is added to insure starting under adverse load and environmental conditions.

The starting circuit 10 is a blocking oscillator composed of transistor $T_4$; transformer 20, with conventional drive, feedback and output windings, 21, 22, and 23; capacitor $C_4$; and resistor $R_3$. This circuit is energized by the input 12, and generates pulses in a well-known manner.

In operation, when power is applied at 12, the pulses from the blocking oscillator 10 are fed thru the diode $D_4$ to the input circuit of the transistor $T_1$, turning the transistor on. Current from the positive terminal 11 of the power input 12 then flows thru the primary 41 of the power transformer 40; thru the primary winding 31 of the current transformer 30; thru the emitter-collector output circuit of transistor $T_1$; and back to the negative input terminal 13.

The first current pulse produces a voltage in the winding 45, of the transformer 40, that is connected across the input of transistor $T_5$. This cuts off the transistor $T_5$ which, in turn disconnects the starting oscillator circuit 10 from the main converter oscillator circuit.

The current flowing thru the winding 31 of the current transformer 30, feeds back current in the winding 32 which is connected between the base and the emitter, input electrodes of transistor $T_1$. This feed-back current drives the transistor $T_1$ into saturation and maintains this condition, since the feed-back current, drive level is directly proportional to the emitter current flowing thru the primary winding 31. The current transformer 30 has a turns ratio of 25:1 between the feed-back winding 32 and the primary winding 31, which produces a forced current gain of 25 in the transistor. The feed-back current drive continues until the core of transformer 30 saturates. At this point the induced feed-back current is no longer maintained, the transistor $T_1$ comes out of saturation, and the transformer polarities are reversed which initiates the termination of the conducting portion of the cycle.

During the conducting portion of the power cycle of the converter, several events occur. Power is supplied to the output load terminals 15 and 17 from the secondary winding 42 of the transformer 40 thru the diode $D_1$; energy is also supplied to and stored in the capacitor $C_2$ by current, thru the diode $D_2$, from a separate voltage winding 43 on the transformer 40; energy is also supplied to the stored in capacitor $C_3$ by current thru the diode $D_3$ from the winding 33 on the transformer 30; and the steering transistors $T_2$ and $T_3$ are biased off by the separate control windings 35 and 34 of transformer 30.

When the conducting portion of the cycle is terminated by the saturating of the core of the current transformer 30, the collapsing flux induces reverse voltages and currents in the control windings 34 and 35; transistor $T_2$ is turned on, connecting $C_2$ to 44, and allowing the energy stored in capacitor $C_2$ to reset the core of transformer 40 thru its reset winding 44. Similarly, transistor $T_3$ is turned on, connecting $C_3$ to 36 and allowing the energy stored in capacitor $C_3$ to reset the core of the transformer 30, driving it into negative saturation thru its reset winding 36. When this occurs, the induced voltages in the control windings 34 and 35 as well as in the drive winding 32 of transformer 30 again reverse and the magnetic flux collapses. This cuts off the transistors $T_2$ and $T_3$ and starts transistor $T_1$ conducting to complete the cycle.

Since the circuit will operate without the starting circuit, once it has started, it is apparent that the starting circuit is not critical and any of several types of circuit that will produce a sharp starting pulse would be suitable for use here. The transistor $T_5$ that disconnects, or decouples, the starting circuit from the rest of the circuit should be employed where there is any question of the starting circuit adversely effecting the operation of the converter circuit itself.

The source of D-C voltage to operate this circuit is not critical and any source of direct voltage may be employed as long as it can provide enough current to perform the necessary functions described here. The source of current could be conventional batteries, or thermionic diodes, or any other well-known D-C generating device.

The design criteria of transformers, with and without saturable cores are well known and are also applicable here. The voltage and current-carrying capacities of the transformers should be suitable for this purpose and to perform the necessary functions.

Similarly, the ratings of the transistors and of the diodes as well as the condensers should be adequate for the voltages and currents to which they will be subjected in operations.

The following are typical values for the various elements of the circuit:

CURRENT TRANSFORMER 30

(Core #A 1070–01 of Magnetic Metals Inc.

31—5/16" copper rod (1 turn)
32—30 turns #16 wire
33—500 turns #25 wire
34—30 turns #25 wire
35—30 turns #25 wire
36—55 turns #25 wire

POWER TRANSFORMER 40

(Core #5114–2A of Magnetic Metals Inc.)

41—2 turns #10 wire 1011 strands
42—40 turns #10 wire
43—49 turns #16 wire
44—5 turns #16 wire
45—4 turns #16 wire

BLOCKING OSCILLATOR TRANSFORMER 20

(Torroidal Ferrite Core)

21—12 turns #30 wire
22—30 turns #30 wire
23—35 turns #30 wire $T_1$—MHT 2101          $D_1$—RS2038 Hughes
$T_2$—2N1482           $D_2$—IN659
$T_3$—2N1482           $D_3$—IN659
$T_4$—Bendix DAP       $D_4$—IN659
$T_5$—2N426            $D_5$—IN659

$C_1$—8800 µfd.        $R_1$—33 ohms
$C_2$—350 µfd.         $R_2$—33 ohms
$C_3$—400 µfd.         $R_3$—390 ohms
$C_4$—1 µfd.           $R_4$—33 ohms

What is claimed is:
1. A converter for use with a low-voltage source of direct current, comprising, a first transformer having a first, a second, a third, a fourth, a fifth, and sixth winding; a second transformer having a first, a second, a third and a fourth winding; a first, power-switching transistor having an input and an output; a second, steering transistor having an input and an output; a third steering transistor having an input and an output; said first, power-switching transistor being connected in series with said first winding of said first transformer and said first winding of said second transformer across said low-voltage source of direct current; said second winding of said first transformer connected to said input of said second, steering transistor; said third winding of said first transformer connected to said input of said third, steering transistor; a first diode; a first capacitor; said first diode connected in series with said fourth winding of said first transformer across said first capacitor; said fifth winding of said transformer connected in series with said output of said second transistor across said first capacitor; a second diode; a second capacitor; said second diode connected in series with said second winding of said second transformer across said second capacitor; said third winding of said second transformer connected in series with said output, of said third transistor across said second capacitor, a third diode; a third capacitor; said third diode connected in series with said fourth winding of said second transformer across said third capacitor to provide the output of said converter; and said sixth winding of said first transformer connected to the input of said first transistor.

2. In a converter as in claim 1 means for actuating said input of said first transistor to initiate the operation of said converter.

3. In a converter as in claim 2 said means for actuating said input of said first transistor, comprising a blocking oscillator and switching means for connecting said blocking oscillator into said converter circuit.

4. In a converter as in claim 3 said switching means comprising a fourth transistor having an input and an output; a fourth diode; a fifth diode; a fifth winding on the said second transformer connected in series with said fourth diode and said input of said fourth transistor; and said output of said fourth transistor connected in series with said blocking oscillator, said fifth diode, and said sixth winding of said first transformer.

References Cited

UNITED STATES PATENTS 3,311,05   3/1967   Kittl et al. _____321–2

JOHN E. COUCH, *Primary Examiner.*

W. H. BEHA, JR., *Assistant Examiner.*

UNITED STATES PATENT OFFICE
CERTIFICATE OF CORRECTION

Patent No. 3,349,311                          October 24, 1967

William L. Dudley

It is hereby certified that error appears in the above numbered patent requiring correction and that the said Letters Patent should read as corrected below.

Column 1, line 63, for "rest" read -- reset --; column 2, line 51, for "the", first occurrence, read -- and --; column 4, line 23, for "of said" read -- of said first --.

Signed and sealed this 22nd day of April 1969.

(SEAL)
Attest:

Edward M. Fletcher, Jr.                        EDWARD J. BRENNER
Attesting Officer                              Commissioner of Patents